United States Patent
Lim et al.

(10) Patent No.: US 9,597,637 B2
(45) Date of Patent: Mar. 21, 2017

(54) EXHAUST GAS POST-PROCESSING APPARATUS AND CONTROL METHOD THEREOF

(71) Applicant: DOOSAN INFRACORE CO., LTD., Incheon (KR)

(72) Inventors: Ji Hoon Lim, Seoul (KR); Min Seok Ko, Gyeonggi-do (KR); Byoung Gul Oh, Gyeonggi-do (KR); Kyung Min Park, Gyeonggi-do (KR); Sang Hoon Kim, Seoul (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 14/374,787

(22) PCT Filed: Jan. 25, 2013

(86) PCT No.: PCT/KR2013/000607
§ 371 (c)(1),
(2) Date: Jul. 25, 2014

(87) PCT Pub. No.: WO2013/111989
PCT Pub. Date: Aug. 1, 2013

(65) Prior Publication Data
US 2015/0023854 A1    Jan. 22, 2015

(30) Foreign Application Priority Data

Jan. 27, 2012   (KR) .......................... 10-2012-0008198

(51) Int. Cl.
*B01D 53/94* (2006.01)
*F01N 3/20* (2006.01)
(Continued)

(52) U.S. Cl.
CPC ..... *B01D 53/9495* (2013.01); *B01D 53/9431* (2013.01); *B01D 53/9477* (2013.01);
(Continued)

(58) Field of Classification Search
None
See application file for complete search history.

(56) References Cited

U.S. PATENT DOCUMENTS 7,712,307 B2 * 5/2010 Braun ................... F01N 3/0231
                                                60/286
7,810,316 B2   10/2010 Salemme et al.
(Continued)

FOREIGN PATENT DOCUMENTS

EP    1217196 A2    6/2002
EP    2075050 A2    7/2009
(Continued)

OTHER PUBLICATIONS

Search Report dated May 14, 2013 and written in Korean with English translation for International Patent Application No. PCT/KR2013/000607 filed Jan. 25, 2013, 9 pages.
(Continued)

*Primary Examiner* — Melvin C Mayes
*Assistant Examiner* — Sheng H Davis
(74) *Attorney, Agent, or Firm* — John D. Veldhuis-Kroeze; Westman, Champlin & Koehler, P.A.

(57) ABSTRACT

The present disclosure relates to an exhaust gas post-processing apparatus, and more particularly, to an exhaust gas post-processing apparatus and a control method thereof which reduce emission of nitrogen oxide (NOx) by bypassing high-temperature exhaust gas to a front end of a selective catalytic reduction. Accordingly, some embodiments of the present disclosure have been made to solve one or more of the aforementioned problems, and some embodiments of the (Continued)

present disclosure increase a reducing rate of nitrogen oxide by controlling a flow of exhaust gas by changing a structure of an exhaust pipe. The exhaust gas post-processing apparatus and the control method thereof according to the present disclosure may increase a reducing rate of nitrogen oxide.

14 Claims, 4 Drawing Sheets

(51) Int. Cl.
| | | |
|---|---|---|
| *F01N 3/031* | (2006.01) | |
| *F01N 13/00* | (2010.01) | |
| *F01N 3/10* | (2006.01) | |
| *F01N 3/021* | (2006.01) | |
| *F02B 37/18* | (2006.01) | |

(52) U.S. Cl.
CPC ............ *F01N 3/031* (2013.01); *F01N 3/208* (2013.01); *F01N 3/2053* (2013.01); *F01N 13/009* (2014.06); *F01N 13/011* (2014.06); *B01D 53/944* (2013.01); *B01D 53/9418* (2013.01); *B01D 53/9436* (2013.01); *B01D 2251/2067* (2013.01); *B01D 2255/00* (2013.01); *B01D 2258/012* (2013.01); *B01D 2258/014* (2013.01); *F01N 3/021* (2013.01); *F01N 3/103* (2013.01); *F01N 3/2066* (2013.01); *F01N 2240/36* (2013.01); *F01N 2560/06* (2013.01); *F01N 2570/18* (2013.01); *F01N 2610/02* (2013.01); *F01N 2900/0416* (2013.01); *F01N 2900/0601* (2013.01); *F01N 2900/1402* (2013.01); *F01N 2900/1404* (2013.01); *F01N 2900/1602* (2013.01); *F01N 2900/1621* (2013.01); *F01N 2900/1622* (2013.01); *F02B 37/18* (2013.01); *Y02T 10/24* (2013.01)

(56) References Cited

U.S. PATENT DOCUMENTS

| | | | | |
|---|---|---|---|---|
| 2006/0213187 | A1* | 9/2006 | Kupe | B01D 53/9431 60/286 |
| 2007/0051096 | A1* | 3/2007 | Pfeifer | B01D 53/9431 60/286 |
| 2008/0155968 | A1* | 7/2008 | Salemme | F01N 3/035 60/288 |
| 2008/0289321 | A1* | 11/2008 | Lu | F01N 3/0842 60/299 |
| 2009/0199537 | A1* | 8/2009 | Sisken | F01N 3/035 60/273 |
| 2010/0064686 | A1* | 3/2010 | Mondori | F01N 3/2053 60/605.2 |
| 2010/0154390 | A1* | 6/2010 | Tsujimoto | F01N 3/0821 60/287 |
| 2011/0131956 | A1* | 6/2011 | Yasui | F01N 3/206 60/277 |

FOREIGN PATENT DOCUMENTS

| | | | |
|---|---|---|---|
| JP | 2005002968 A | | 1/2005 |
| JP | 2005023921 A | | 1/2005 |
| KR | 10-0851474 | | 8/2008 |
| KR | 10-2009-0063719 | | 6/2009 |
| KR | 10-0993359 | | 11/2010 |
| WO | 2010-114876 | | 10/2010 |
| WO | 2011057649 | * | 5/2011 |
| WO | 2011086129 | * | 7/2011 |
| WO | 2012059180 | * | 5/2012 |

OTHER PUBLICATIONS

European Search Report dated Sep. 4, 2015 for European Application No. 13741177.3, 8 pages.

* cited by examiner

US 9,597,637 B2

EXHAUST GAS POST-PROCESSING APPARATUS AND CONTROL METHOD THEREOF

CROSS-REFERENCE TO RELATED APPLICATION

This Application is a Section 371 National Stage Application of International Application No. PCT/KR2013/000607, filed Jan. 25, 2013 and published, not in English, as WO 2013/111989 on Aug. 1, 2013.

FIELD OF THE DISCLOSURE

The present disclosure relates to an exhaust gas post-processing APPARATUS, and more particularly, to an exhaust gas post-processing apparatus and a control method thereof which reduce emission of nitrogen oxide (NOx) by bypassing high-temperature exhaust gas to a front end of a selective catalytic reduction.

BACKGROUND OF THE DISCLOSURE

In general, an engine sucks, compresses and explodes a mixture of fuel and oxygen. Exhaust gas, which is created when the mixture of fuel and air is exploded, is discharged into the atmosphere through an exhaust pipe, and a large amount of materials such as carbon monoxide (CO), nitrogen oxide (NOx), and unburned hydrocarbon (HC), which are harmful to the human body, is included in the exhaust gas.

In particular, in comparison with a gasoline engine that uses gasoline and an LPG engine that uses LPG, in the case of a diesel engine that uses diesel, a large amount of nitrogen oxide (NOx), which is a harmful material, is produced because fuel is combusted in an environment in which oxygen is excessive, and it is difficult to remove nitrogen oxide because fuel is combusted in a lean-burn environment.

Therefore, an exhaust gas post-processing apparatus is mounted in a diesel vehicle in order to reduce the aforementioned harmful material, and a urea-based selective catalytic reduction apparatus is representatively used.

The UREA-SCR system uses a method of supplying urea in an aqueous solution form to an exhaust gas line, allowing nitrogen oxide (NOx) and urea ($NH_2$—CO—$NH_2$), which is obtained by thermally decomposing urea using high-temperature exhaust gas, to react, and converting nitrogen oxide (NOx) into nitrogen ($N_2$) and oxygen ($O_2$).

However, in the selective catalytic reduction apparatus, high-temperature exhaust gas discharged from an engine flows into a selective catalytic reduction (SCR) via a diesel oxidation catalyst (DOC) and a diesel particulate filter (DPF), and as a result, there is a problem in that there is a time delay when a temperature of a front end of the selective catalytic reduction and a temperature of a carrier is raised to an appropriate temperature because heat is emitted while the exhaust gas is moved.

In a case in which temperatures of the selective catalytic reduction apparatus and the front end of the selective catalytic reduction are low when the engine initially starts as described above, a crystallization phenomenon in which urea is accumulated in a pipe when a urea aqueous solution is injected (a phenomenon in which the urea is chemically converted into ammonia ($NH_3$) while being thermally decomposed at a temperature of about 100° to 150° or more after the urea is injected, and the urea is whitely accumulated while being attached to an inside of the pipe merely in the urea state at a low temperature), such that the system is destroyed, or an amount of urea, which flows into a carrier of the selective catalytic reduction, is smaller than an amount of produced nitrogen oxide (NOx) due to a partial shut-off phenomenon, and as a result, there is a problem in that a reducing rate of nitrogen oxide (NOx) becomes low.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Accordingly, some embodiments of the present disclosure have been made to solve the aforementioned problems, and an object of some embodiments of the present disclosure is to increase a reducing rate of nitrogen oxide by controlling a flow of exhaust gas by changing a structure of an exhaust pipe.

Another object of some embodiments of the present disclosure is to prevent a crystallization phenomenon of piping by increasing a reducing rate of nitrogen oxide when an engine initially starts.

To this end, an exhaust gas post-processing apparatus for an engine according to the present disclosure, which removes nitrogen oxide (NOx) by supplying urea to an exhaust gas line, includes: an exhaust pipe which is connected with an exhaust manifold of the engine so as to discharge the exhaust gas discharged from the engine; a diesel oxidation catalyst which is disposed in the exhaust pipe and purifies the exhaust gas; a selective catalytic reduction which is disposed in the exhaust pipe at a rear end of the diesel oxidation catalyst, and performs a catalytic reduction reaction so as to reduce nitrogen oxide (NOx) in the exhaust gas passing through the diesel particulate filter; a first bypass pipe which branches off from the exhaust pipe between the engine and the diesel oxidation catalyst so as to bypass the entirety or a part of the exhaust gas to a front end of the selective catalytic reduction; and a first switching means which adjusts an amount of exhaust gas that is bypassed to the first bypass pipe when the engine starts or in accordance with temperature information associated with the engine.

The exhaust gas post-processing apparatus may further include a diesel particulate filter which is disposed in the exhaust pipe at the front end of the selective catalytic reduction, and secondarily purifies the exhaust gas passing through the diesel oxidation catalyst.

The exhaust gas post-processing apparatus may further include an ammonia oxidation catalyst which is disposed in the exhaust pipe at a rear end of the selective catalytic reduction, oxidizes ammonia ($NH_3$) in the exhaust gas, and reduces nitrogen oxide.

The exhaust gas post-processing apparatus may further include: a second bypass pipe which bypasses the entirety or a part of the exhaust gas passing through the first bypass pipe to a front end of the diesel particulate filter installed in the exhaust pipe; and a second switch which controls an amount of exhaust gas that is bypassed to the second bypass pipe.

An exhaust pipe may branch off from the exhaust pipe at the rear end of the selective catalytic reduction, a third switch, which adjusts an amount of exhaust gas passing through the branched exhaust pipe, may be installed in the branched exhaust pipe, and ammonia oxidation catalysts having different capacities may be installed the exhaust pipes that branch off at a rear end of the third switch.

The temperature information associated with the engine may be any one of a temperature inside the engine, a temperature of exhaust gas flowing into the selective catalytic reduction, and a temperature of the selective catalytic reduction.

The first switch may be provided at a position where the first bypass pipe branches off from the exhaust pipe.

In addition, a control method of an exhaust gas post-processing apparatus according to the present disclosure which includes a diesel oxidation catalyst for purifying exhaust gas and a selective catalytic reduction, which performs a catalytic reduction reaction in order to reduce nitrogen oxide in the exhaust gas, which are sequentially installed in an exhaust pipe which is connected with an exhaust manifold of an engine so as to discharge the exhaust gas, and has a first bypass pipe which branches off from the exhaust pipe at a front end of the diesel oxidation catalyst and is bypassed to and communicates with a front end of the selective catalytic reduction, includes: a step of adjusting an amount of exhaust gas, which is bypassed to the first bypass pipe, when the engine starts or in accordance with temperature information associated with the engine.

The temperature information associated with the engine may be any one of a temperature inside the engine, a temperature of exhaust gas flowing into the selective catalytic reduction, and a temperature of the selective catalytic reduction.

An amount of urea, which is injected into the exhaust pipe in accordance with the temperature information associated with the engine, may be larger than a reference value, and as time passed, the amount of urea is decreased to the reference value.

One of an amount of nitrogen oxide in the exhaust gas and an amount of ammonia adsorbed to a carrier of the selective catalytic reduction, and an injection amount of urea, which is injected into the exhaust pipe, may be larger than a reference value, and as time passed, the amount of urea may be decreased to the reference value.

In the step of adjusting the amount of exhaust gas which is bypassed to the first bypass pipe, a switch for adjusting exhaust gas installed in the exhaust gas may be controlled using an ON/OFF method or a pulse width modulation (PMW) method.

In the step of adjusting the amount of exhaust gas which is bypassed to the first bypass pipe, a maximum amount of exhaust gas may be bypassed when a temperature of the selective catalytic reduction (SCR) is in a predetermined first temperature region, and when the temperature reaches a predetermined second temperature region, the amount of exhaust gas may be gradually decreased so as to be a minimum amount.

When the engine starts, an amount of exhaust gas, which is bypassed to the first bypass pipe, may be gradually decreased as time passed.

The exhaust gas post-processing apparatus and the control method thereof according to the present disclosure may increase a reducing rate of nitrogen oxide.

In addition, a crystallization phenomenon may be prevented from occurring in piping by increasing a reducing rate of nitrogen oxide when an engine initially starts.

DESCRIPTION OF MAIN REFERENCE NUMERALS OF THE DRAWINGS

Figure 1:
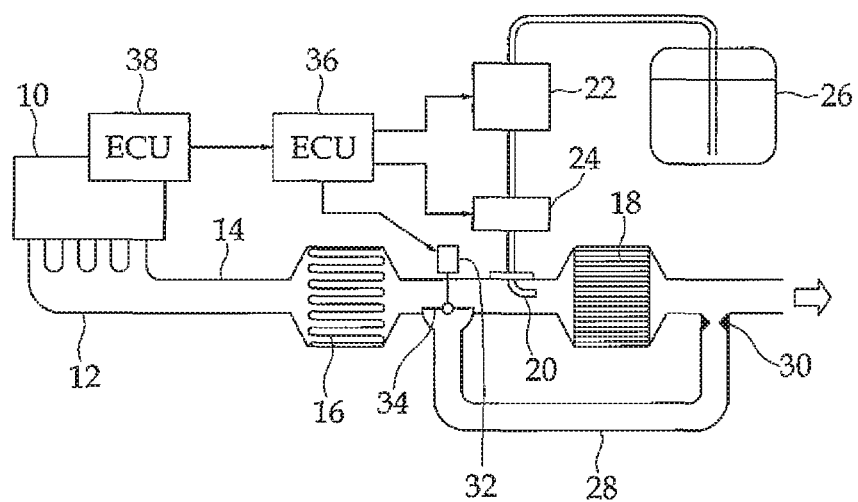
FIG. 1 is a schematic explanatory view of an exhaust gas post-processing apparatus according to the related art.

100: Engine
300: Exhaust pipe
301: First divided exhaust pipe
303: Second divided exhaust pipe
310: Diesel oxidation catalyst (DOC)
330: Diesel particulate filter (DPF)
331: Small Diesel Particulate Filter
350: Selective catalytic reduction (SCR)
371: First ammonia oxidation catalyst (AOC)
373: Second ammonia oxidation catalyst
400: Intake pipe
401: Compressor
410: Air filter
500: First bypass pipe
510: First switch
600: Second bypass pipe
610: Second switch
710: Third switch

DETAILED DESCRIPTION

Hereinafter, an exhaust gas post-processing apparatus and a control method according to an exemplary embodiment of the present disclosure will be described in detail with reference to the accompanying drawings so that those with ordinary skill in the art to which the present disclosure pertains may easily carry out the exemplary embodiment. The present disclosure is not limited to the exemplary embodiments described herein, and may be implemented in various different ways.

A part irrelevant to the description will be omitted to clearly describe the present disclosure, and the same or similar constituent elements will be designated by the same reference numerals throughout the specification.

Figure 2:
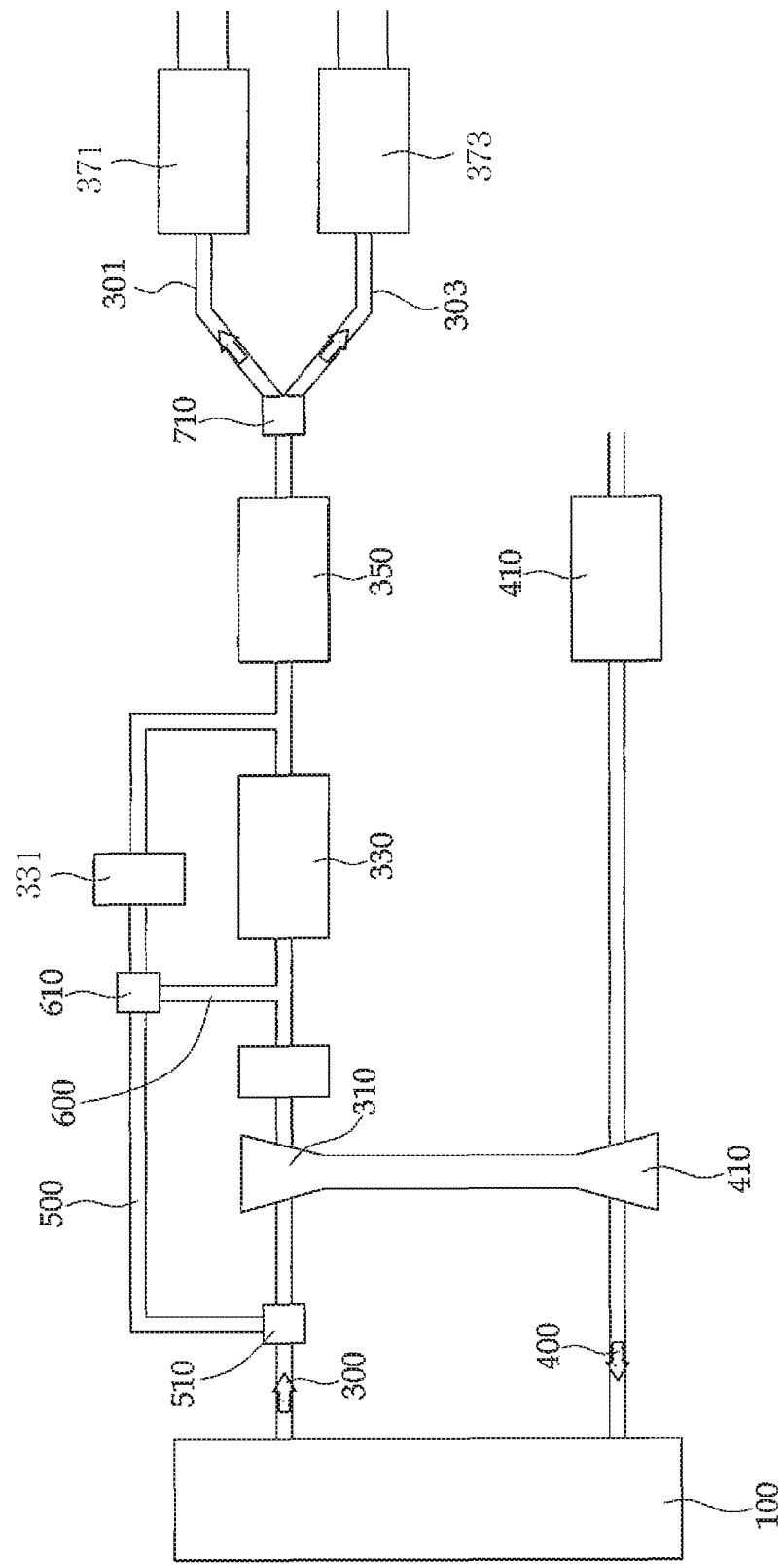
FIG. 2 is a schematic explanatory view regarding an exhaust gas post-processing apparatus according to the present disclosure.

As illustrated in FIG. 2, an exhaust gas post-processing apparatus according to the present disclosure includes an exhaust pipe 300 which discharges exhaust gas discharged from an engine 100 into the atmosphere, and an intake pipe 400 which supplies fresh air into the engine 100.

One end of the exhaust pipe 300 is connected with the engine 100 or an exhaust manifold (not illustrated) of the engine 100, and the other end of the exhaust pipe 300 is opened so that the exhaust gas may be discharged into the atmosphere.

In addition, in the exhaust gas post-processing apparatus according to the present disclosure, high-temperature exhaust gas flows into the exhaust pipe 300 connected with the engine 100, and the exhaust gas primarily passes through a diesel oxidation catalyst 310, such that soot and smoke are reduced. In addition, the exhaust gas passing through the diesel oxidation catalyst 310 passes through exhaust gas post-processing apparatuses such as a diesel particulate filter 330, a small diesel particulate filter 331, a selective catalytic reduction 350, and a first and second ammonia oxidation catalysts 371 and 373 such that harmful materials such as soot and smoke, and nitrogen oxide are reduced.

In some cases, one or more exhaust gas post-processing apparatuses such as the diesel oxidation catalyst 310, the diesel particulate filter 330, and the small diesel particulate filter 331 may be provided, and any one of the exhaust gas post-processing apparatuses may be omitted. In addition, the order in which the exhaust gas post-processing apparatuses are arranged in the exhaust pipe 300 may be selectively changed.

The diesel oxidation catalyst 310 is a diesel oxidation catalyst, one of the apparatuses for reducing diesel soot and smoke using a catalyst, and an apparatus for reducing soluble organic fractions (SOF) included in particulate matters (PM) in exhaust gas, and harmful carbon monoxide (CO) and hydrocarbon (HC) included in exhaust gas, using oxidation by a catalyst coated on a ceramic carrier.

The ceramic carrier has a honeycomb structure, is coated with the catalyst while having a wide surface area, and has a set of small cells. In this case, as the catalyst, expensive precious metal such as platinum (Pt) or palladium (Pd) may be used to allow active chemical reaction.

The diesel particulate filter (DPF) 330 and the small diesel particulate filter 331 are each apparatuses for reducing soot and smoke, and apparatuses which physically capture particulate matters (PM) in exhaust gas from the diesel engine using respective filters, and reduce pollutants by raising a temperature of exhaust gas to an ignition temperature (550°) of the particulate matters or more, and burning the particulate matters after a vehicle travels a predetermined distance.

By the diesel particulate filter, soot in substances of the exhaust gas discharged from the diesel engine may be reduced, 90% or more of fine dust discharged from the diesel vehicle may be filtered, and 80% or more of nitrogen oxide may also be removed.

The diesel particulate filters 330 and 331 may each have pressure and temperature sensors (not illustrated) at front and rear ends thereof, and the sensor senses pressure and temperature before and after the exhaust gas passes through the diesel particulate filters 330 and 331, such that an engine control unit (ECU) controls the engine and associated apparatuses so as to remove the accumulated particulate matters (PM).

The first and second ammonia oxidation catalysts 371 and 373 (AOC) oxidize ammonia, and may be implemented by copper (Cu)-incorporating zeolite impregnated with precious metal (platinum, palladium, and rhodium), iron (Fe)-incorporating zeolite impregnated with precious metal, or copper (Cu), silicon (Si)-incorporating alumina catalyst composition impregnated with precious metal.

The selective catalytic reduction (SCR) 350 uses a method of supplying an urea aqueous solution to an exhaust gas line, allowing nitrogen oxide (NOx) and urea ($NH_2$—CO—$NH_2$), which is obtained by thermally decomposing urea using heat of high-temperature exhaust gas, to react, and converting nitrogen oxide (NOx) into nitrogen ($N_2$) and oxygen ($O_2$).

Here, the urea is used as a compound containing ammonia, but other materials such as an ammonia aqueous solution or a compound including ammonia may be used instead of the urea. That is, a compound in other forms including ammonia may be used instead of the urea.

The selective catalytic reduction 350 may be provided to continuously supply a urea aqueous solution, which is used as a reducing agent, and prevent a nozzle from being clogged by a urea reaction product. To this end, a urea aqueous solution supply apparatus (not illustrated) may be included, a urea solution storage tank (not illustrated), which stores a urea aqueous solution and presses the urea aqueous solution so as to send the urea aqueous solution to a urea injection apparatus through the nozzle, may be further included in the urea aqueous solution supply apparatus, and one or more filters (not illustrated) may be further included.

In addition, there may be further included a flow rate adjuster (not illustrated) which adjusts an injection amount of urea aqueous solution, a urea injection apparatus (not illustrated) which is connected to the flow rate adjuster through the nozzle so as to inject the urea aqueous solution, and a cleaning apparatus which is connected between the urea injection apparatus and the filter so as to clean an interior of the nozzle.

In addition, a process of reducing nitrogen oxide by operating the selective catalytic reduction 350 may include a step of pressing the urea aqueous solution stored in the urea solution storage tank using compressed air, a step of filtering impurities or precipitates by allowing the urea aqueous solution to be pressed and conveyed by compressed air and to pass through the filter, a step of injecting the filtered urea aqueous solution from the urea injection apparatus by adjusting an injection amount of urea aqueous solution using the flow rate adjuster, and a step of removing nitrogen oxide from exhaust gas by decomposing the injected urea aqueous solution into a gaseous product and ammonia, and allowing the nitrogen oxide to react on the catalyst.

As illustrated in FIG. 2, the exhaust gas discharged from the engine 100 may sequentially pass through the diesel oxidation catalyst 310, the diesel particulate filter 330, the small diesel particulate filter 331, the selective catalytic reduction 350, and the first and second ammonia oxidation catalysts 371 and 373, and in some cases, the order in which the exhaust gas discharged from the engine 100 passes through the diesel oxidation catalyst 310, the diesel particulate filters 330 and 331, the selective catalytic reduction 350, and the first and second ammonia oxidation catalysts 371 and 373 may be changed or omitted.

As illustrated in FIG. 2, the exhaust gas post-processing apparatus according to the present disclosure may have a first switch 510 that is provided in the exhaust pipe 300 that connects the engine 100 and the diesel oxidation catalyst 310. In addition, a first bypass pipe 500, which is connected with the first switch 510 and serves to bypass the entirety or a part of the exhaust gas using the first switch 510, may be provided on the exhaust pipe 300.

Therefore, the entirety or a part of the exhaust gas discharged from the engine 100 or the exhaust manifold (not illustrated) of the engine 100 may flow into the first bypass pipe 500 while being bypassed, and in order to control the exhaust gas that is bypassed to the first bypass pipe 500, the first switch 510 is provided at a connection portion between the first bypass pipe 500 and the exhaust pipe 300.

One end of the first bypass pipe 500 communicates with the first switch 510 and the exhaust pipe 300 between the engine 100 and the diesel oxidation catalyst 310, and the other end of the first bypass pipe 500 communicates with the exhaust pipe 300 between the diesel particulate filter 330, the small diesel particulate filter 331, and the selective catalytic reduction 350.

Therefore, the high-temperature exhaust gas discharged from the engine 100 flows into the first bypass pipe 500 through the first switch 510 disposed between the engine 100 and the diesel oxidation catalyst 310, and then is discharged to the exhaust pipe 300 between the diesel particulate filters 330 and 331, and the selective catalytic reduction 350, such that the high-temperature exhaust gas may directly flow into the selective catalytic reduction 350 without passing through the diesel oxidation catalyst 310 and the diesel particulate filters 330 and 331.

Accordingly, a flow when the exhaust gas discharged from the engine 100 directly flows into the selective catalytic reduction 350 via the first switch 510 through the first bypass pipe 500 is called a flow F1 hereinafter.

Figure 3:
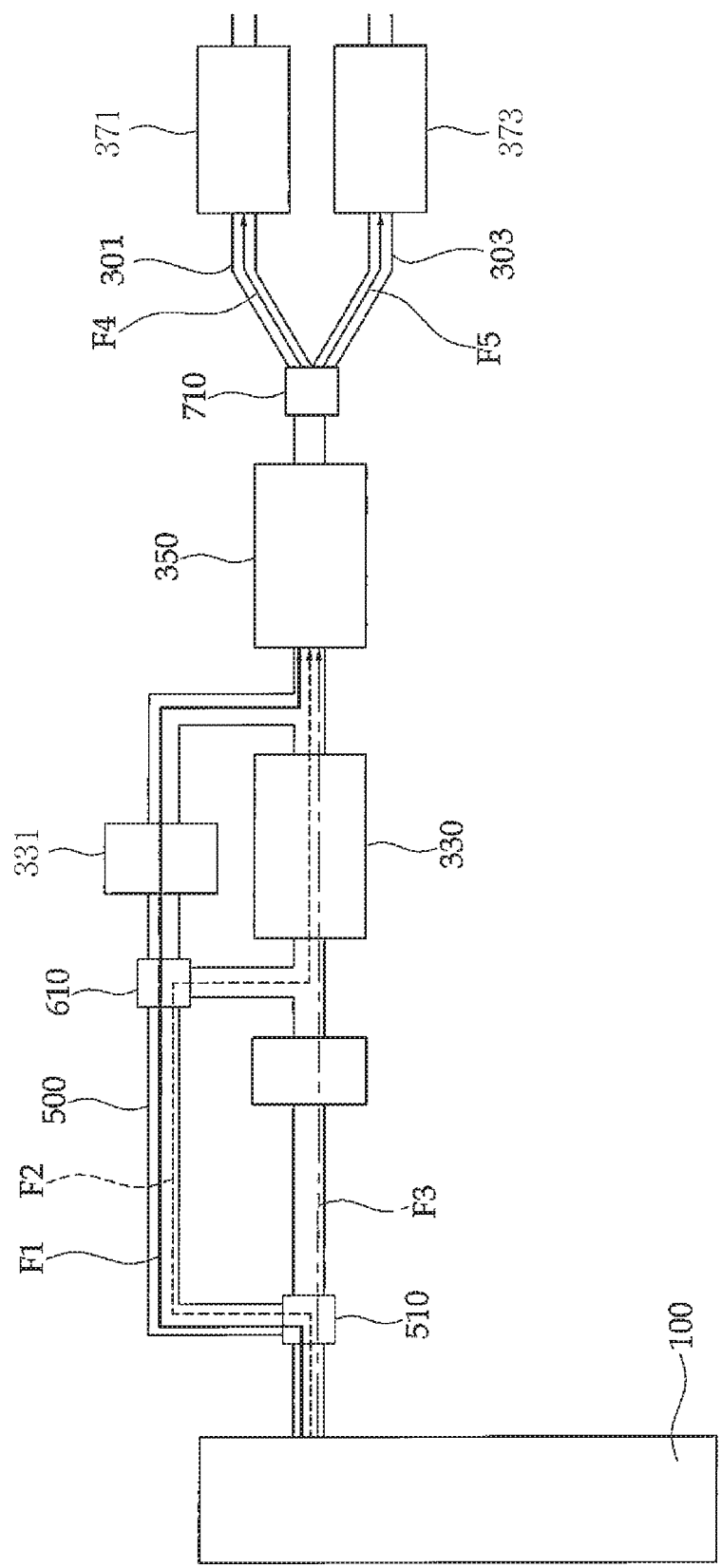
FIG. 3 is a detailed explanatory view regarding an exhaust pipe of FIG. 2.

As illustrated in FIGS. 2 and 3, the exhaust gas post-processing apparatus according to the present disclosure may further include a second bypass pipe 600 which is connected to branch off from the first bypass pipe 500 and to be merged with the exhaust pipe 300 between the diesel oxidation catalyst 310 and the diesel particulate filters 330 and 331.

The second bypass pipe 600 branches off from the first bypass pipe 500, and a second switch 610 may be provided at a connection portion between the first bypass pipe 500 and the second bypass pipe 600 in order to control an amount of exhaust gas that is branched off.

The entirety or a part of the exhaust gas, which is controlled by the second switch 610, is divided into the flow F1 that is a flow when the exhaust gas flows into the front end of the selective catalytic reduction 350 through the first bypass pipe 500, and then flows into the front end of the small diesel particulate filter 331, and a flow F2 that is a flow when the exhaust gas is controlled by the second switch 610, flows into the second bypass pipe 600, and then flows into the front end of the diesel particulate filter 330.

In addition, in order to bypass the exhaust gas to bypass passages such as the first bypass pipe 500 and the second bypass pipe 600, the exhaust gas may be bypassed in a case in which a temperature inside the engine or a temperature of a coolant is equal to or more than a predetermined specific temperature value.

The flow F1 and the flow F2 are disposed such that any one of the flow F1 and the flow F2 may be present, and in some cases, the flow F1 and the flow F2 may be simultaneously performed by controlling the first switch 510 and the second switch 610.

In addition, in a case in which a large amount of soot is expected when a small diesel particulate filter fails or is forcedly regenerated, the flow of the exhaust gas may be changed to the diesel particulate filters 330 and 331 line by controlling the second switch 610.

The first switch 510 and the second switch 610 may be an ON/OFF type control apparatus, and in some cases, may be used as a PWM duty control type.

In addition, the exhaust gas discharged from the engine 100 is prevented from flowing into the first bypass pipe 500 by controlling the first switch 510 such that the entire amount of exhaust gas flows into the exhaust pipe 300, and as a result, a flow F3, which is a flow when the exhaust gas sequentially or selectively passes through the diesel oxidation catalyst 310, the diesel particulate filter 330, and the selective catalytic reduction 350, may be exhibited.

The exhaust gas passing through the selective catalytic reduction 350 flows into the first and second ammonia oxidation catalysts 371 and 373, and as illustrated in FIGS. 2 and 3, the exhaust gas post-processing apparatus according to the present disclosure may have a third switch 710 between the selective catalytic reduction 350 and the first and second ammonia oxidation catalysts 371 and 373. Therefore, the exhaust gas passing through the selective catalytic reduction 350 flows by being separated by the branched exhaust pipe, and the separated exhaust gas flows into the first and second ammonia oxidation catalysts 371 and 373.

In this case, a flow when the entirety or a part of the exhaust gas, which is controlled by the third switch 710, passes, may be called a flow F4, and another flow, which is distinguished from the flow F4, may be called a flow F5. In addition, the first and second ammonia oxidation catalysts 371 and 373 into which the exhaust gas which is discharged after passing through the selective catalytic reduction 350 flows may be provided while having different standards.

Typically, an injection amount of urea is determined in accordance with an amount of nitrogen oxide included in the exhaust gas, and a temperature of the exhaust gas that flows into the selective catalytic reduction. An injection amount of urea, which is specified by a manufacturer using an experimental method so as to be desirable for an amount of nitrogen oxide and a temperature of the exhaust gas, is determined and stored in the system, that is, a memory embedded in the engine control unit, and the engine control unit commands the urea injection apparatus to inject urea using command data associated with the injection amount of urea.

In addition, the urea injection amount may also be determined by an amount of ammonia adsorbed to the carrier, which is present in the selective catalytic reduction, in addition to the amount of nitrogen oxide in the exhaust gas and the temperature of the exhaust gas. The command date associated with the injection amount of urea may be implemented in a table form, or may be estimated data by algorithm data.

In addition, a control method of the exhaust gas post-processing apparatus may be controlled based on whether equipment starts, and may include: a step of determining whether the equipment starts; an exhaust gas bypassing step of allowing high-temperature exhaust gas discharged from an engine of the equipment to bypass the diesel oxidation catalyst for a predetermined time, preferably, about 5 to 10 minutes, when the equipment starts; a step of removing the bypass so that the exhaust gas flows to the diesel oxidation catalyst again after the predetermined time has passed; and an ammonia adjusting step of adjusting an injection amount of ammonia or a compound including ammonia in accordance with a temperature of the exhaust gas in the selective catalytic reduction.

In addition, the control method of the exhaust gas post-processing apparatus may include: a step of measuring a temperature of the selective catalytic reduction which estimates whether a temperature of the exhaust gas flowing into the selective catalytic reduction or a temperature of the selective catalytic reduction apparatus is a predetermined temperature or higher; an ammonia adjusting step of adjusting an injection amount of urea or a compound including ammonia in accordance with the temperature measured in the step of measuring the temperature of the selective catalytic reduction; and an exhaust gas bypassing step of adjusting and bypassing an amount of high-temperature exhaust gas discharged from the engine in accordance with the temperature measured in the step of measuring the temperature of the selective catalytic reduction.

In addition, an exhaust gas bypass valve is completely opened so that the entirety of the exhaust gas is bypassed in a case in which a temperature of the exhaust gas or a temperature of the selective catalytic reduction apparatus is in a first temperature region, for example, about 90° C. or lower, the bypass valve begins to be gradually closed in a case in which the temperature exceeds the first temperature region, 90° C., and the bypass valve is completely closed in a case in which the temperature is in a second temperature region, for example, about 190° C.

In addition, a temperature when the bypass valve is completely opened or a temperature when the bypass valve is completely closed may be experimentally determined in accordance with design of an equipment system.

When describing a flow of the exhaust gas with reference to FIG. 3, in the case of the flow F1 and the flow F2 of the exhaust gas, an injection amount of urea is determined in accordance with the command data associated with the injection amount of urea which is stored in the engine control unit.

In addition, in the case of the flow F2, a flow control method is used when a small diesel particulate filter fails or is forcedly regenerated and a large amount of soot is expected, and in the case of the flow F1, high thermal energy is transferred to the front end of the selective catalytic reduction 350 at the highest speed, and as a result, a larger amount of urea is injected in comparison with the case of the flow F2.

In addition, in the case of the flow F3, a normal amount of urea is injected, and in the case of the flow F1 and the flow F2, the third switch 710 at a rear end of the selective catalytic reduction 350 is opened to make the flow F4. In addition, the first and second ammonia oxidation catalysts 371 and 373 in the case of the flow F4 has a large capacity, which means that it is standard when the entirety of ammonia, which is discharged without participating in a reaction in the selective catalytic reduction, may be oxidized. In the case of the flow F3, the third switch 710 is closed to make the flow F5.

In addition, by the present disclosure, a system in which the AOC is omitted may be implemented by suppressing urea that does not react in the selective catalytic reduction but is discharged.

The control method of the exhaust gas post-processing apparatus according to the present disclosure includes: an engine checking step of determining a point of time at which an engine starts and a state of the engine by measuring the number of revolutions of the engine, a temperature of the engine, and an amount of fuel; a urea adjusting step of adjusting an injection amount of urea by comparing the number of revolutions, the temperature and the amount of fuel, which have been measured in the engine checking step, with predetermined values; and an exhaust gas bypassing step of bypassing the high-temperature exhaust gas discharged from the engine by comparing the number of revolutions, the temperature and the amount of fuel, which have been measured in the engine checking step, with predetermined values.

In the exhaust gas bypassing step, the entirety or a part of the exhaust gas discharged from the engine may be bypassed to the front end of the selective catalytic reduction, and the entirety or a part of the bypassed exhaust gas may be bypassed to the front end of the diesel particulate filter.

In order to bypass the exhaust gas as described above, one or more switches may be provided in the exhaust pipe, and the switch may be provided as an ON/OFF type or a pulse width modulation (PWM) duty control type.

Figure 4:
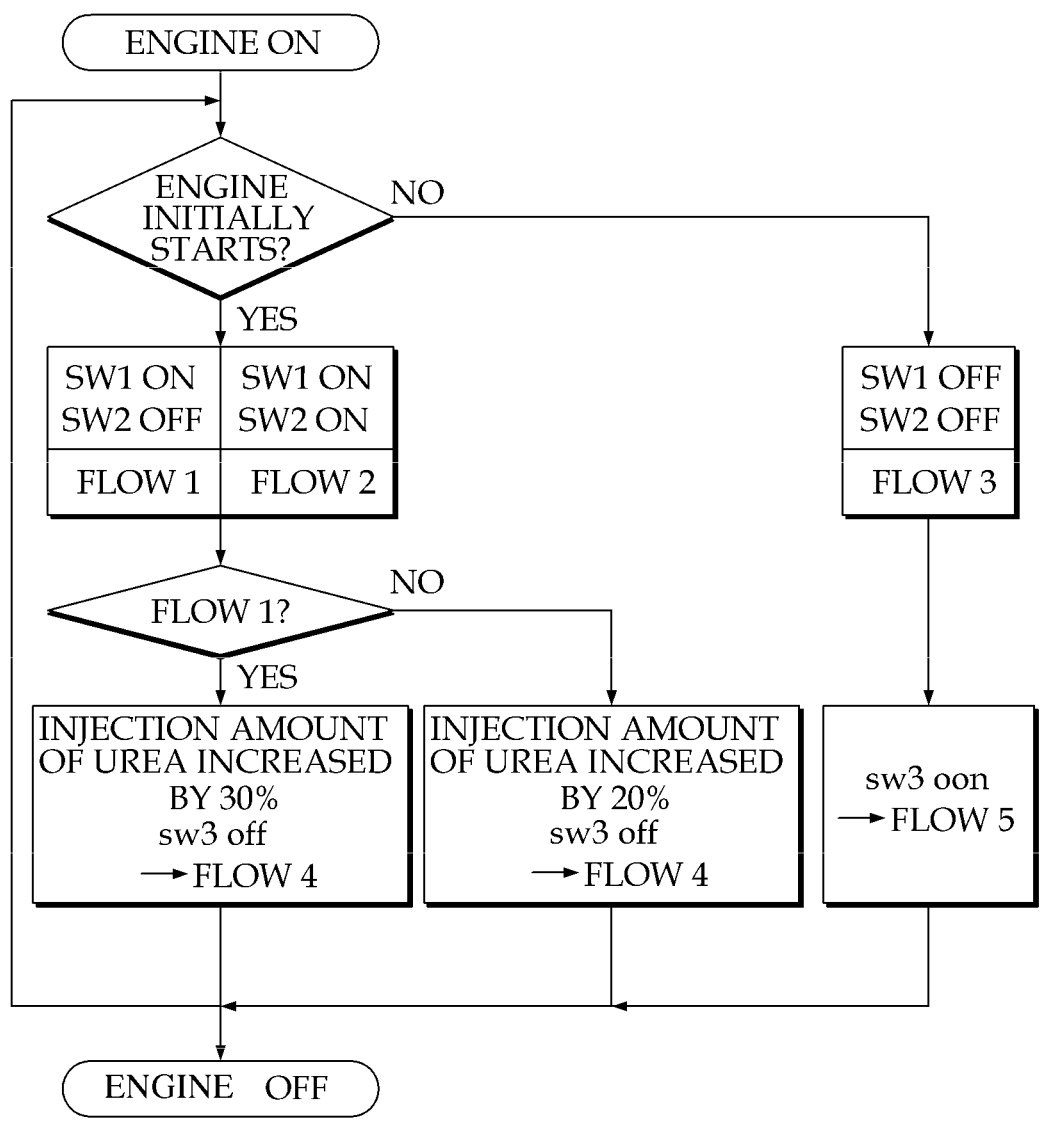
FIG. 4 is a procedure flow chart regarding a control method of an exhaust gas post-processing apparatus according to the present disclosure.

As illustrated in FIG. 4, when a point of time is not a point of time at which the engine starts, the first switch 510 and the second switch 610 are closed to maintain the flow F3. That is, because a point of time is not the point of time at which the engine begins to be operated, the exhaust gas with an appropriate temperature may be supplied to the selective catalytic reduction 350, and the aforementioned problem (crystallization) does not occur, such that it is not necessary to bypass the exhaust gas discharged from the engine 100 to the first bypass pipe 500, and the entire amount of exhaust gas can pass through the exhaust pipe 300, through the diesel oxidation catalyst 310, the diesel particulate filter 330, and the small diesel particulate filter 331, and thereafter, flows into the selective catalytic reduction 350. In this case, the third switch 710 may be opened to allow the flow F3 to be continued to the flow F5.

In addition, when a point of time is a point of time at which the engine 100 begins to be operated, the first switch 510 is opened and the second switch 610 is closed in accordance with selection, and the flow F1, that is, the exhaust gas discharged from the engine 100 passes through the first bypass pipe 500, such that the exhaust gas may flow to be discharged to the front end of the selective catalytic reduction 350, and both the first switch 510 and the second switch 610 may be opened to maintain the flow F2.

Accordingly, in the case of the flow F1, an injection amount of urea is increased by 30%, and the third switch 710 may be closed to allow the flow F1 to be continued to the flow F4, and in a case in which a flow is not the flow F1 but the flow F2, an injection amount of urea is increased by 20%, and the third switch 710 may be closed to allow the flow F2 to be continued to the flow F4.

The present disclosure, which has been described above, is not limited by the aforementioned exemplary embodiment and the accompanying drawings, and it is obvious to those skilled in the corresponding field that simple substitutions, modifications and changes may be made within the technical spirit of the present disclosure.

The exhaust gas post-processing apparatus and the control method according to the present disclosure may be used for an exhaust gas post-processing apparatus and a control method which provides high-temperature exhaust gas discharged from an engine directly to a front end of a selective catalytic reduction, and increases a reducing rate of nitrogen oxide.

The invention claimed is:

1. An exhaust gas post-processing apparatus for an engine of construction equipment, which removes nitrogen oxide (NOx) by supplying urea in an aqueous solution to an exhaust gas line, the exhaust gas post-processing apparatus comprising:
   an exhaust pipe which is configured to connect with an exhaust manifold of the engine so as to discharge exhaust gas discharged from the engine;
   a diesel oxidation catalyst which is in the exhaust pipe and configured to purify the exhaust gas;
   a selective catalytic reduction which is downstream of the diesel oxidation catalyst, and configured to perform a catalytic reduction reaction so as to reduce nitrogen oxide (NOx) by supplying urea in an aqueous solution form to the exhaust gas, in the exhaust pipe, that has passed through the diesel oxidation catalyst;
   a first bypass pipe which branches off from the exhaust pipe between the engine and the diesel oxidation catalyst so as to bypass the entirety or a part of the exhaust gas to upstream of the selective catalytic reduction; and
   a first switch which is at a point where the first bypass pipe branches off from the exhaust pipe, and when a temperature of the exhaust gas is lower than a first predetermined temperature, a temperature of the selective catalytic reduction is lower than a second predetermined temperature, or a temperature inside the engine is lower than a third predetermined temperature, the first switch is configured to adjust an amount of exhaust gas that is bypassed to the first bypass pipe, wherein the first switch is opened so that the exhaust gas is bypassed from the exhaust pipe when the temperature of the exhaust gas or the selective catalytic reduction is within a predetermined first temperature region, wherein the first switch is closed when temperature of the exhaust gas or the selective catalytic reduction reaches a predetermined second temperature region, and wherein the second temperature region is higher than the first temperature region.

2. The exhaust gas post-processing apparatus of claim 1, further comprising:

a diesel particulate filter, which is between the diesel oxidation catalyst and the selective catalytic reduction in the exhaust pipe, and is configured to secondarily purify the exhaust gas passing through the diesel oxidation catalyst, wherein the first bypass pipe rejoins the exhaust pipe between the diesel particulate filter and the selective catalytic reduction.

3. The exhaust gas post-processing apparatus of claim 2, further comprising:

a second bypass pipe, which branches off from the first bypass pipe and is configured to bypass the entirety or a part of the exhaust gas that flows into the first bypass pipe to upstream of the diesel particulate filter; and a second switch, which is at a point where the second bypass pipe branches off from the first bypass pipe and is configured to control an amount of exhaust gas that is bypassed to the second bypass pipe.

4. The exhaust gas post-processing apparatus of claim 1, wherein the exhaust pipe is divided into a first divided exhaust pipe and a second divided exhaust pipe downstream of the selective catalytic reduction, and wherein the apparatus further comprises:

a third switch, which is configured to adjust an amount of exhaust gas that flows into the first divided exhaust pipe and the second divided exhaust pipe, and is downstream of the selective catalytic reduction;

a first ammonia oxidation catalyst, which is in the first divided exhaust pipe; and a second ammonia oxidation catalyst having a capacity different from a capacity of the first ammonia oxidation catalyst, which is in the second divided exhaust pipe.

5. A control method of an exhaust gas post-processing apparatus for construction equipment that includes an exhaust pipe which is configured to discharge exhaust gas discharged from an engine of the construction equipment, a diesel oxidation catalyst which is installed in the exhaust pipe and configured to purify exhaust gas, a selective catalytic reduction that is downstream of the diesel oxidation catalyst and configured to perform a catalytic reduction reaction in order to reduce nitrogen oxide in exhaust gas by supplying urea in an aqueous solution form to the exhaust gas passed through the diesel oxidation catalyst, a first bypass pipe which branches off from the exhaust pipe upstream of the diesel oxidation catalyst and rejoins the exhaust pipe upstream of the selective catalytic reduction, and a first switch configured to adjust an amount of exhaust gas that is bypassed to the first bypass pipe, the control method comprising:

a step of identifying a temperature of the exhaust gas, a temperature of the selective catalytic reduction, or a temperature inside the engine; and a step of bypassing the entirety or part of the exhaust gas into the first bypass pipe, when a temperature of the exhaust gas is lower than a first predetermined temperature, a temperature of the selective catalytic reduction is lower than a second predetermined temperature, or a temperature inside the engine is lower than a third predetermined temperature, wherein the first switch is opened so that the exhaust gas is bypassed from the exhaust pipe when the temperature of the exhaust gas or the selective catalytic reduction is within a predetermined first temperature region, wherein the first switch is closed when temperature of the exhaust gas or the selective catalytic reduction reaches a predetermined second temperature region, and wherein the second temperature region is higher than the first temperature region.

6. The control method of claim 5, wherein the first switch begins to be gradually closed when temperature of the exhaust gas or the selective catalytic reduction is higher than the predetermined first temperature region and lower than the predetermined second temperature region.

7. The control method of claim 5, wherein when the engine starts, the first switch is opened for a predetermined time so that the exhaust gas bypasses the diesel oxidation catalyst.

8. The exhaust gas post-processing apparatus of claim 3, further comprising: a small diesel particulate filter which is between the second switch and a point where the first bypass pipe rejoins the exhaust pipe in the first bypass pipe, and is configured to purify exhaust gas flows into the selective catalytic reduction through the first bypass pipe.

9. The control method of claim 5, further comprising a step of performing a catalytic reduction reaction in order to reduce nitrogen oxide in the exhaust gas by supplying urea in an aqueous solution form to the exhaust gas passed through the diesel oxidation catalyst, wherein an injection amount of urea of the catalytic reduction reaction is increased when the first switch is opened.

10. The control method of claim 5, wherein the first temperature region is substantially equal to or lower than 90° C., and the second temperature region is substantially equal to or higher than 190° C.

11. The control method of claim 5, wherein the exhaust gas post-processing apparatus further comprises:

a diesel particulate filter which is between the diesel oxidation catalyst and the selective catalytic reduction in the exhaust pipe, and is configured to secondarily purify exhaust gas passing through the diesel oxidation catalyst;

a second bypass pipe which branches off from the first bypass pipe and rejoins the exhaust pipe upstream of the diesel particulate filter; and a second switch which is at a point where the second bypass pipe branches off from the first bypass pipe, and is configured to control an amount of exhaust gas that is bypassed to the second bypass pipe.

12. An exhaust gas post-processing apparatus for an engine, which removes nitrogen oxide (NOx) by supplying urea to an exhaust gas line, the exhaust gas post-processing apparatus comprising:

an exhaust pipe which is connected with an exhaust manifold of the engine so as to discharge the exhaust gas discharged from the engine;

a diesel oxidation catalyst which is in the exhaust pipe and configured to purify the exhaust gas;

a selective catalytic reduction which is in the exhaust pipe at a rear end of the diesel oxidation catalyst, and configured to perform a catalytic reduction reaction so as to reduce nitrogen oxide (NOx) in the exhaust gas passing through a diesel particulate filter;

a first bypass pipe which branches off from the exhaust pipe between the engine and the diesel oxidation catalyst so as to bypass the entirety or a part of the exhaust gas to a front end of the selective catalytic reduction;

a first switch configured to adjust an amount of exhaust gas that is bypassed to the first bypass pipe when the engine starts or in accordance with temperature information associated with the engine;

a plurality of ammonia oxidation catalysts, which are each in the exhaust pipe downstream of the selective catalytic reduction, and are each configured to oxidize ammonia (NH3) in the exhaust gas and reduce nitrogen oxide, wherein the exhaust pipe branches off into a plurality of divided exhaust pipes that each include at least one of the plurality ammonia oxidation catalysts, and wherein each the ammonia oxidation catalysts have different capacities; and a second switch, which is configured to adjust amounts of exhaust gas passing through the divided exhaust pipes.

13. The exhaust gas post-processing apparatus of claim 2, further comprising: a small diesel particulate filter which is in the first bypass pipe, and is configured to purify exhaust gas flows into the selective catalytic reduction through the first bypass pipe.

14. The exhaust gas post-processing apparatus of claim 1, wherein the first switch begins to be gradually closed when temperature of the exhaust gas or the selective catalytic reduction is higher than the predetermined first temperature region and lower than the predetermined second temperature region.

* * * * *